March 10, 1953
R. C. BEITZ
2,630,736
SPECTROPHOTOMETER
Filed Sept. 16, 1947
2 SHEETS—SHEET 2
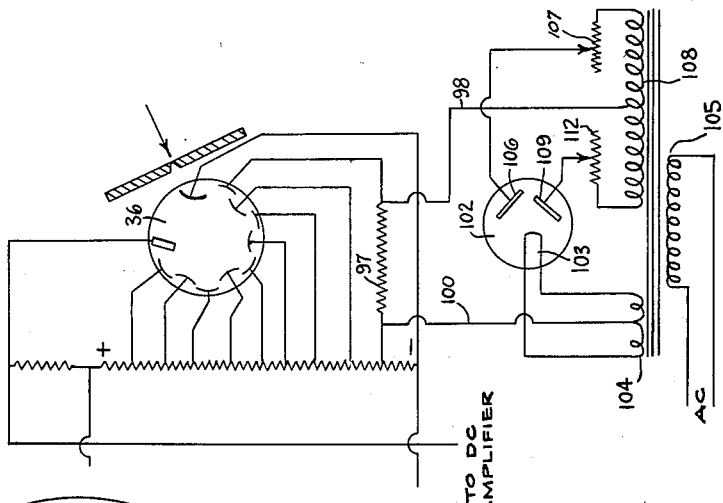
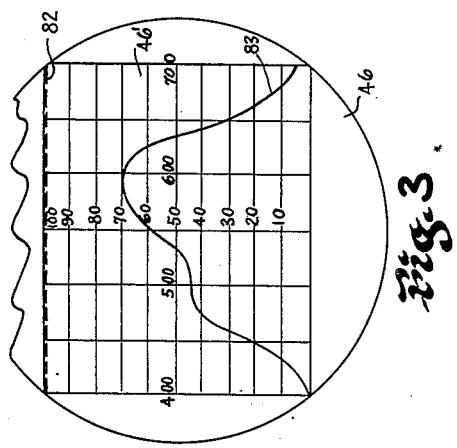
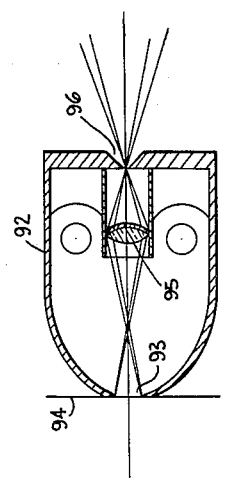
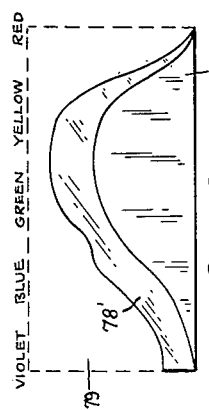
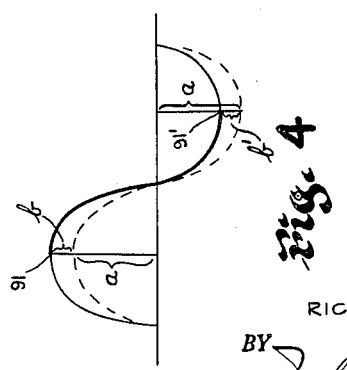
*INVENTOR.*
RICHARD C. BEITZ
BY
ATTORNEY Patented Mar. 10, 1953

2,630,736

UNITED STATES PATENT OFFICE 2,630,736

SPECTROPHOTOMETER

Richard C. Beitz, Buffalo, N. Y., assignor to American Optical Company, Southbridge, Mass., a voluntary association of Massachusetts Application September 16, 1947, Serial No. 774,393

16 Claims. (Cl. 88—14)

This invention relates to color analyzing apparatus and more particularly to spectrophotometric apparatus for providing substantially instantaneously and simultaneously visual indications of the several wave lengths and respective intensities of light either transmitted by or reflected from various materials while under examination. The apparatus of the present invention is so constructed and arranged that even though the material being examined may be of fixed or of changing color characteristics, immediate analyzation of the material may be obtained, thus allowing, for example, its use in many commercial processes and the like for indicating needed adjustments or corrections of the process without delay. Accordingly more uniform maintenance of required standards, high qualities and other desired properties in the goods or materials being produced may be had by use of the apparatus or device of the present invention.

This invention accordingly comprises apparatus for illuminating and analyzing the color characteristics of either transparent or opaque materials in such a way that the component colors of the material and their respective intensities may be individually and simultaneously graphically presented upon a calibrated screen or the like, so that same may be visually inspected, compared, traced, photographed or the like. The analyzing apparatus comprises simple and inexpensive means for so modifying the combined normal performance characteristics of parts of the apparatus that for transmitted or reflected light there is produced upon the screen a luminous substantially straight line indicating substantially 100% transmission (or reflectance, as the case may be) for each of the several color components thereof. Thus when material is inserted for analysis, the intensities of the several color components thereof may be individually and simultaneously indicated by per cent transmission or some other well understood evaluating units.

Furthermore, the apparatus is arranged so that the several wave lengths received from the material may be indicated in a horizontal direction upon the screen and the intensities or percentages of transmission (or reflectance) indicated in the vertical direction and in such proportions to calibrations on the screen as to accurately present thereon a well-known form of percentage transmission curve (or percentage reflectance curve). The apparatus further comprises simple, lightweight, compact and inexpensive means which is operable upon a conventional source of alternating current and arranged to cause said light analyzing means to produce a wave motion in a definite phase relation to and of like frequency with the current supply. Adjustable means is provided to cause this wave motion to have a definite wave form of such shape as to accurately produce upon a rectilinearly calibrated screen or upon a progressively increasing calibrated screen (corresponding to the natural spacing of the spectrum colors) said percentage transmission and percentage reflectance curves. This adjustable means also allowing compensating for slight variations in functioning of the apparatus. The apparatus additionally includes means for removing or "blanking out" portions of the "curve" which normally would appear upon the screen, portions which would not be truly representative of the color characteristics of the material under consideration. And, furthermore, readily operable means is provided for allowing adjustment of the apparatus so as to modify its white light performance for slightly modifying end portions of the "curve" upon the screen to allow for an accurate adjustment thereof into a straight line condition for 100% transmission or reflectance at all spectrum wave lengths.

The invention will be better understood from the detailed description which follows when taken in conjunction with the accompanying drawings in which:

Fig. 2 is a diagrammatic view taken substantially on section line 2—2 of Fig. 1 and looking in the direction of the arrows;

Fig. 3 is an end view of an oscilloscope showing a rectilinear graph which may be placed thereon;

Fig. 4 is a diagrammatic representation of wave forms which may be produced by the apparatus of Fig. 1;

Fig. 5 is a diagrammatic view of illuminating means for use in analyzing opaque materials; and Fig. 6 is a diagrammatic view of a modification of the structure of Fig. 1.

Figure 1:
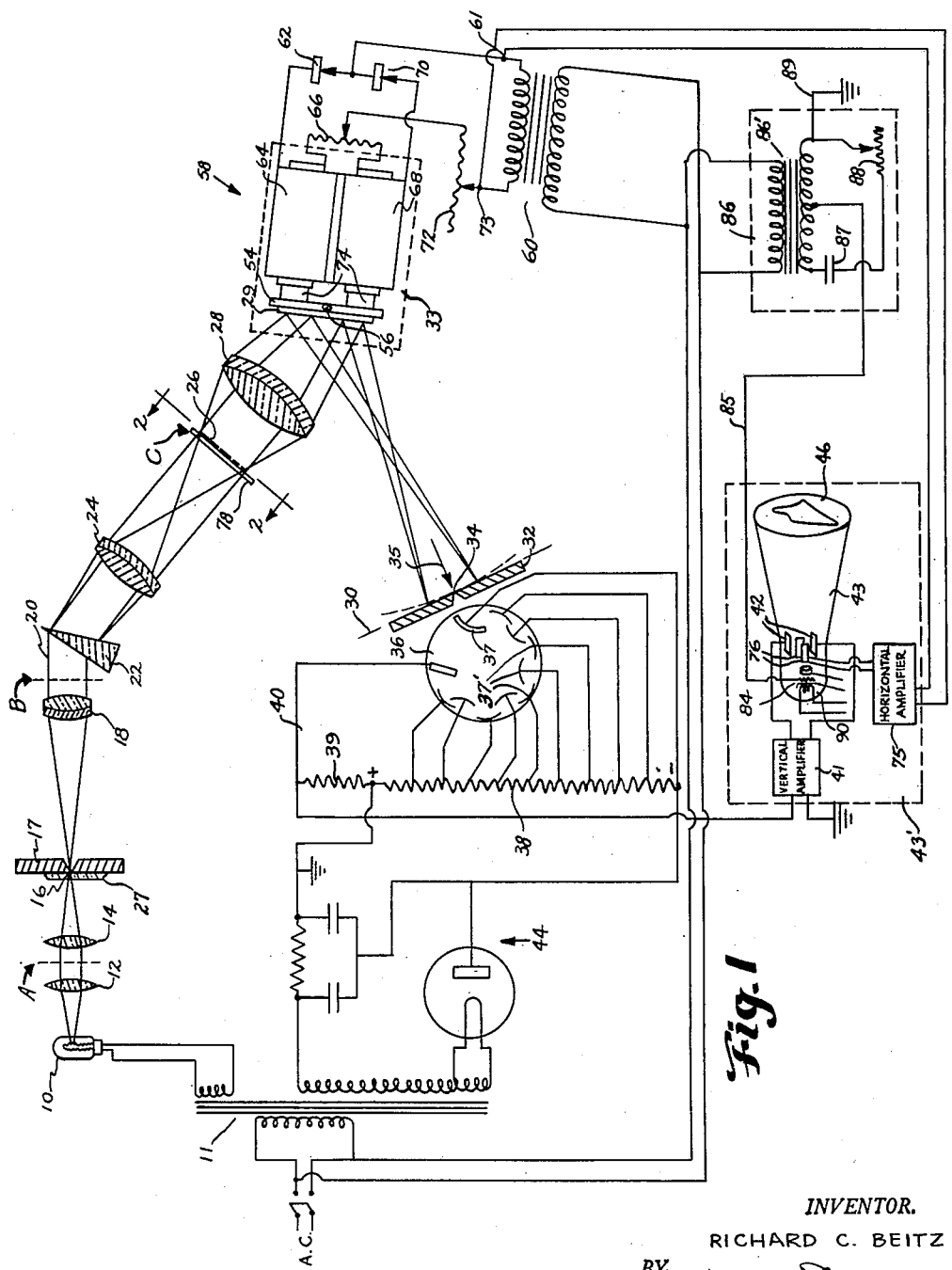
Fig. 1 shows a diagrammatic representation of a preferred form of the apparatus of the present invention arranged for use with transparent materials.

Referring to the drawings in detail and particularly Fig. 1, the numeral 10 indicates an incandescent bulb or the like arranged to be energized by current received from a secondary coil of a transformer 11 which has its primary arranged for connection to a conventional 60 cycle alternating current supply or the like. This bulb or equivalent light source supplies radiant energy which is collected and focused by a pair of condenser lenses 12 and 14 at the plane of an entrant slit 16 formed in a wall 17. The slit 16 thus serves as a secondary source of illumination and a collimating lens system 18 is positioned to focus on this slit and produce a beam of parallel light 20 which impinges upon a surface of a prism 22. The prism 22 serves to refract and disperse this beam 20 and a lens system 24 is so positioned relative thereto that it serves to focus the light as a spectrum at a predetermined plane 26. In this way the more or less white light emitted at the entrant slit 16 is broken up into its component colors. The parts of the apparatus just described diagrammatically represent a well-known form of monochromator. A filter 27 or combination of filters to correct or modify, as desired, the light emitted by the light source may be inserted in the optical system of the monochromator and preferably placed adjacent the partition 17.

Optically aligned with the lens system 24 of the monochromator and positioned so as to be focused at the plane 26 is a lens system 28 arranged to form an image of the spectrum at a distance therefrom. For reasons which will appear presently it is desirous to align a reflector or mirror 29 with the lens system 28 and arrange it in such angular relation relative to this lens system that the image forming rays will be directed to one side of the lens system 28 and re-image the spectrum at a focal plane 30. Positioned at this focal plane 30 is a partition 32 provided with an exit slit 34 extending parallel to the slit 16 and thus transversely of the elongated direction of the spectrum. It will be clear that normally the light near the center of the spectral image at the plane 30 will pass through slit 34 and since this slit is relatively narrow such will be substantially monochromatic light. For reasons which will appear later it may be desirable that the center of the spectral image normally fall slightly to one side or the other of the slit and accordingly partition 32 may be arranged for movement laterally along plane 30, or the reflector supporting base 33 may be angled slightly to give this off center condition.

A photosensitive device such as a conventional electron multiplier 36 is positioned closely adjacent the slit 34 and so as to receive the light rays passing through said slit and indicated by arrow 35 upon the cathode 37 of the tube. This radiant energy received by the photosensitive cathode produces a photoelectric current in the tube which is greatly amplified by the successive dynodes 37' thereof. These dynodes are connected at successive points along a resistance 38 as clearly indicated in Fig. 1. This current is effected by applying across the terminals of resistance 38 a relatively high D. C. potential which effectively places each successive dynode at a more positive bias. In the anode circuit 40 is placed a second resistance 39 so that the signal drop across this resistance may be transmitted to the D. C. amplifier 41, of known construction, which serves to suitably magnify the signal or impulse so that the output of the amplifier may be impressed upon a vertical set of plates 42 of an oscilloscope tube 43 of an oscilloscope indicated by the dotted lines 43'. A convenient means for supplying the D. C. potential for the electron multiplier 36 may comprise a half wave rectifier 44 which is arranged to receive from a secondary of the transformer 11 electrical energy so as to provide a direct current of high voltage, in the neighborhood of 1,000 volts, to the opposite ends of resistance 38 as indicated. Obviously, other known forms of power supply as well may be employed for supplying this high D. C. potential to tube 36.

The amount of vertical deflection of the cathode beam of the oscilloscope tube 43 will be substantially directly proportional to the intensity of the radiant energy impinging upon the cathode of the multiplier 36. Since exit slit 34 is relatively narrow in comparison with the total length of the spectrum at plane 30 (in the neighborhood of $\frac{1}{10}$ mm. when spectrum equals 40 mm.) only a relatively small portion of the spectrum will be transmitted through slit 34 at any one time. It will be clear also that if the spectral image at the plane 30 is moved relative to the slit 34 the radiant energy at different wave lengths will in turn impinge upon the cathode 37, will be sensed by the multiplier 36 and electrical impulses directly proportional thereto will be supplied to the D. C. amplifier and serve accordingly to deflect the cathode ray vertically amounts equal to the intensities of the radiant energy received.

In order that the spectral image at plane 30 may be moved across exit slit 34 so that the intensities of the radiant energy at all portions thereof may be successively sensed by the photosensitive tube 36 and accordingly indicated graphically upon a fluorescent screen 46 of the oscilloscope tube, applicant has provided for the first surface mirror or reflector 29 a soft iron supporting member 54 pivoted centrally thereof so that it may be oscillated rapidly about an axis 56 which is substantially parallel to slits 17 and 34 and sufficiently to successively move all portions of the spectral image across slit 34. The member 54 forms the moving part of a controllable electric motor 58. It has been found desirable to arrange motor 58 so as to follow substantially the well-known sinusoidal wave characteristics of the conventional source of alternating current supply which is to be employed for operating the apparatus. The alternating current supply is connected to a transformer 60 and the secondary of this transformer is arranged to energize motor 58. Transformer terminal 61 is connected to a dry disc or equivalent rectifier 62 which is in turn connected to one terminal of an electromagnet 64. The opposite terminal of this magnet is connected to one end of a variable insistance 66 which has its opposite end connected to one terminal of a second electromagnet 68. The other terminal of the electromagnet 68 is connected to a rectifier 70 and this rectifier connected to the terminal 61. A variable arm of resistance 66 is in turn connected to a second resistance 72 and an adjustable arm associated therewith is connected to the opposite secondary terminal 73 of transformer 60.

The motor circuit just described is such that during one half cycle of the alternating current supply a current is allowed to pass from terminal 61 through rectifier 62, electromagnet 64, resistances 66 and 72 to the other terminal 73. During the other half cycle the path of the current in the opposite direction will be from terminal 73 through resistances 72 and 66, electromagnet 68 and rectifier 70 to the opposite terminal 61. Thus during one half cycle the electromagnet 64 will be energized so as to attract the mirror or reflector supporting member 54 and during the other half cycle electromagnet 68 will be energized so as to attract the member. Thus an oscillation will be set up in the member 54 and reflector 29 which will directly follow the alternating current frequency of the current supplied by the secondary of transformer 60.

Biasing the member 54 into a normal or neutral position are a pair of resilient members 74 which may be formed of sponge rubber or the like. Or, if desired, other suitable yieldable means such as light coil or leaf springs may be employed for urging member 54 toward said neutral position. Thus pivotal movement of the member 54 about the axis 56 will cause the spectral image to be moved through an arc totalling a few degrees, with the result that all portions of the spectral image at the plane 30 will be caused to successively traverse slit 34 and allow the radiant energy, if any, of successive wave lengths to successively impinge upon the cathode of the multiplier tube 36. The combined effect of the attractive force of each electromagnet 64 or 68 as it builds up during each cycle and the compressive force of the resilient member 74 which builds up progressively in opposition thereto is such as to produce a substantially uniform sinusoidal wave motion for reflector 29.

Also connected to the secondary terminals of the transformer 60 is a D. C. or A. C. horizontal amplifier 75 which may be of conventional construction and connected to a pair of horizontal deflection plates 76 of the oscilloscope tube so as to cause the cathode beam to travel transversely across the viewing screen thereof in synchronism with the frequency and phase of the alternating current supply received from transformer 60. The cathode beam will be caused to move across the tube in one direction as the mirror 29 is moved in one direction and will be caused to move in the opposite direction as the mirror moves in a reversed direction.

It is desirable to be able to control or regulate the amplitude of swing of the reflector 29 and thus the amount of travel of the spectral image across and even beyond the exit slit 34, when desired, and for this purpose the adjustable resistance 72 is provided. A decrease in the amount of resistance at 72 will increase the current through electromagnets 64 and 68 and thus the swing or amplitudes $a$ for the dotted line curve in Fig. 4 of the reflector 29 to opposite sides of its neutral position. Or an increase in resistance will decrease the swing. It will be clear that when the swing is made to equal the length of the spectral image the image will be scanned by a substantially true sinusoidal wave motion and the successive wave lengths will be similarly plotted along the horizontal upon the screen 46. It should be kept in mind, however, that the spectral distribution resulting from an optical refracting prism is not of a linear nature and, accordingly, the spacings between successive wave lengths are not uniform throughout all parts of the resulting spectrum. For example, in a visible spectrum produced by a refracting prism, the successive wave lengths toward the red end thereof are somewhat "pinched together" as compared to those nearer the blue end of the spectrum. In order to employ a substantially rectilinear scale in the horizontal direction (along the abscissa) upon the viewing screen 46 and the graph 46′ positioned thereon, instead of this natural progressively increasing wave length spacings of the spectrum, the reflector 29 may be allowed to travel through a greater angular amount or amplitude for one half cycle than for the other half cycle. However, since the intervals during both half cycles are equal, it will be apparent that instantaneous rates of travel of the mirror during its longer swing to one side will be greater than the corresponding rates during its shorter swing to the other side, and this non-linear condition, which can be readily varied by controllable means now to be described, can be utilized to advantage in producing a portion of each cycle of oscillation which will have characteristics such as to approximately compensate for the non-linear spectral distribution characteristics of the prism 22 so that said substantially rectilinear wave length scale may be used upon screen 46 for correct wave length readings thereon. For this reason, the adjustable resistance 66 is provided in the connection between the electromagnets. In this way, the current through magnet 64 may be increased or decreased at the expense of the current through magnet 68 and thus the wave form of the oscillating reflector 52 during one half cycle may be increased a desired amount, for example, as indicated at $b$ and during the other half cycle decreased a substantially equal amount as indicated at $b'$ in Fig. 4. The resultant wave motion may accordingly be changed to a more desirable usable shape by moving the adjustable arm of resistor 66 one way or the other. Of course, the maximum amplitude of the reflector may be controlled or obtained by a subsequent readjustment of resistor 72. When the adjustable arm of resistance 66 is in a center position the amount of swing will be the same in both directions and no altering of the wave motion will be produced thereby. Obviously when such a condition is desirable the resistance 66 could as readily be omitted from the circuit and resistance 72 connected directly to the adjacent terminals of the magnets 64 and 68.

The source of radiant energy and the optical elements of the monochromator, as well as the different response characteristics of the electron multiplier 36 for various wave lengths, may so affect the magnitude of the electrical impulses supplied by the anode circuit 49 that for white light the luminous line produced upon the oscilloscope screen 46 does not appear as a substantially straight line thereon. For this reason, it has been found advantageous to employ at or closely adjacent the plane 26 a relatively thin equalizing stop or diaphragm 78 of opaque material. This diaphragm is made of such predetermined configuration (see Fig. 2) that each wave length of the spectrum at 26 may be modified, if desired, and in any amount desired so that all wave lengths of the modified spectrum will produce electrical impulses of equal magnitude in circuit 49 and thus a substantially horizontal straight line upon the oscilloscope screen when white light is being indicated thereon. It is equally possible to employ at or adjacent plane 26 in Fig. 1 a semi-transparent medium or filter which will absorb in certain parts of the spectrum and also to provide a predetermined shape or contour to edge portions thereof so as to control the amount of absorption in various wave lengths. In fact, both the opaque diaphragm 78 and a semi-transparent diaphragm 78′ could be used together adjacent plane 26, as shown by Fig. 2, when desired, and each provided with wave length controlling shaped edges.

Fig. 2 is also intended to represent at numeral 79 the total rectangular spectrum normally occurring at the plane 26. The diaphragms 78 and 78' may serve to remove predetermined amounts of radiant energy from various or most of the wave lengths thereof so that the resultant line upon the oscilloscope screen will be straight when no material is in the apparatus for analyzation. Obviously one or both diaphragms may be used and either one modified or changed for a diaphragm of a different shape, should a different type of lamp, for example, be substituted in the monochromator, or should it be desired to correct for some other characteristics of the apparatus.

It is here noted that transparent materials or specimens may be positioned for examination either in the parallel beam between the condenser lenses 12 and 14 (as indicated by station A), which is preferred, or in the parallel beam 20 (as indicated by station B), or even at the plane 26 (station C) and that the radiant energy of the various wave lengths transmitted beyond plane 26 and modified (equalized) by the diaphragm or diaphragms, may be successively directed through exit slit 34 to impinge upon the cathode of the tube 36 as the reflector 29 is oscillated. Thus the intensities of the various successive wave lengths transmitted by the material may be sensed by tube 36 and amplified by the amplifier 41 which is connected to the deflection plates 42. The plates 42 set up an electrostatic field which serves to proportionally deflect the cathode beam vertically in the tube 43. Since the beam is simultaneously being moved horizontally across the screen by the horizontal amplifier 75 in synchronism with the movement of reflector 29 the cathode beam will trace an irregularly curved path upon the screen which depends upon the transmission properties of material being examined.

In Fig. 3 is shown a graph 46' representing rectilinearly in the horizontal direction (along the abscissa) wave lengths from 400 to 700 millimicrons and in the vertical direction (along the ordinate) percentage of energy transmission. This graph may be permanently secured directly on the tube 36 or removably but accurately positioned in adjacent relation thereto. A dotted line 82 on the graph indicates the normal white light "curve" or luminous path of the beam when no specimen is in the optical path. The solid line 83, on the other hand, indicates a position to which the luminous line might be suppressed immediately upon the insertion of material, for example a plate of colored glass, into the system.

The characteristics of the apparatus are such that when the device is properly compensated to provide the white line path of the beam across the screen 46 in one direction its return travel may not exactly coincide therewith and for this reason it has been found advantageous to apply to the conventional control grid 84 of such an oscilloscope tube a blanking potential derived from the A. C. supply line and shifted in phase as necessary for eliminating the return trace of the beam during the undesired half cycle from the tube 43. This grid or modulation connection is connected by a lead 85 to an adjustable phase shift circuit of any known suitable type which may be connected across the A. C. power supply.

One such phase shift circuit is indicated at 86 and comprises a transformer 86' which has one secondary terminal connected to a condenser 87 which is in turn connected to an adjustable resistance 88 and the adjustable arm of this resistance is connected with the opposite terminal of the secondary and adjusted so as to provide a proper phase change. A ground connection indicated at 89 is also secured to this terminal. The result of this arrangement is such that for ½ cycle the beam of the tube 43 is "blanked out" by a bias placed on the grid which is of a negative potential with respect to the cathode 90, and this blanking out is so applied to the cathode beam as to be approximately ¼ cycle out of phase with the mirror and the horizontal amplifier of the tube 43. The result is that only the heavy portion of the cycle between points 91 and 91' (Fig. 4) will be illuminated and the return sweep or trace of the cathode beam will be removed from the screen 46.

Reference has previously been made to the supporting base 33 for the motor 58. When this member is arranged for angular movement, preferably about an axis coincident with the pivotal mean 56, the motor and reflector 29 may be readily adjusted so as to place the center of the spectral image normally "off center" a predetermined amount relative to the slit 34. Thus a preferred portion of the useful half cycle of the wave motion, controlled by resistances 66 and 72, may be utilized. In such case the blanking phase control 88 may be readjusted so as to properly eliminate undesired parts of the curve from screen 46.

In Fig. 5 there is shown an illuminated chamber 92 having an opening 93 against which opaque material 94 may be pressed. The light from the material at opening 93 is concentrated by a lens system 95 upon an entrant slit 96, corresponding to slit 16 in Fig. 1. Filters may be inserted in the optical path, if desired. The rest of the apparatus for examination of opaque materials will be like that required for transparent materials. It will be readily apparent that the color characteristics of opaque material may be as readily visually indicated upon a viewing screen as in the previous embodiment of Fig. 1.

A modified form of the apparatus is shown in Fig. 6 and may be employed to modify slightly, or if desired in considerable amounts, the white line path characteristics as shown upon the screen 46 should it be necessary to raise or suppress one end portion or the other end portion of the path to cause it to assume a substantially straight line. The construction of Fig. 6 employs in the first dynode circuit of the electron multiplier 36 a resistance 97 and to the opposite ends of this resistance are connected the conductors 98 and 100. A full wave rectifier, in phase with the oscillating reflector 29, is provided at 102 and employs a heater 103 connected to a secondary 104 of a transformer 105 which has its primary connected to the source of A. C. current. The electron emission from the heater 103 will set up an electron flow to an anode 106 during ½ cycle allowing current to flow through a circuit comprising an adjustable resistance 107, the right hand half of a secondary 108 of the transformer 105, the lead 98, resistance 97, lead 100, one half of the secondary 104 and to the heater 103. This flow tends to change accordingly the positive potential of the first dynode circuit of the electron multiplier 36 with reference to the cathode thereof. During the other half cycle an electron emission from heater 103 will travel to plate 109 which will allow current to flow through adjustable resistance 112, the left hand half of the secondary 108, the conductor 98, resistance 97, lead 100 and through the other half of the secondary 104 to the heater 103.

The arrangement is such that a ripple will be super-imposed upon the D. C. current in the first dynode circuit of the electron multiplier. Since resistances 107 and 112 are variable and since they control circuits which operate alternately they may be employed to adjust as desired the opposite end portions of the white light path 82. By so doing it is possible to accurately control the sweep of the cathode beam such as to compensate for slight changes in the equipment, aging or replacement of the lamp 10, accumulation of dirt or film upon optical parts or slight mechanical changes due to wear and the like. Thus for practical purposes the adjustable resistors 107 and 112 may be employed to bring end portions of the path of the beam on screen 46 into substantial coincidence with the 100 per cent line of the graph upon screen 46.

In certain uses of the apparatus where a linear wave length scale is not necessary along the abscissa of the graph overlying screen 46 it is possible to use with the oscilloscope a linear sweep oscillator of known construction, instead of the horizontal amplifier, and adjust same to the line frequency and phase of the tube 43. This would produce a forward and a reverse crossing of the slit 34 by the spectral image during each sweep of the oscilloscope tube. The horizontal gain control and the horizontal position control (not shown) of the oscilloscope 43' would then be so set as to select only the preferred one of these two slit crossings and display same upon the screen 46. When the apparatus is to be so used the blanking circuit shown at 85 to 89 is unnecessary. The retrace of the beam is substantially invisible due to its high velocity between each forward sweep of the beam.

While not shown in the drawing, it will be readily apparent from the preceding description that instead of oscillating the reflector 29 by the motor means 58 the wall 32 and exit slit 34 could as readily be oscillated by this motor means to effect a scanning of the spectral image in synchronism with the horizontal sweep of the electron stream of the oscilloscope 2. The only material changes necessitated by such a modified construction would be that the wall 32 be of relatively lightweight opaque material and the cathode of electron multiplier be of such size that it will properly receive the light passing through the movable slit for all positions thereof. In such a construction the reflector 29 may remain in the optical system or may be omitted, in which case the exit slit will be located substantially in axial alignment with the lens system 28. The use of the reflector does, however, allow a more compact construction. However, because the apparatus of Fig. 1 is of simpler construction, it is preferred.

It will be clear that the parts of the device or apparatus of the invention are of such a size and character that they may be arranged in a compact but efficient assembly and transported readily to various locations for use in the substantially instantaneous and simultaneous accurate analyzation of the color characteristics of materials in many and varied types of commercial processes.

Attention is called to application Serial No. 292,694 which was filed June 10, 1952, and which is a division of this application.

I claim:

1. Spectrophotometric apparatus comprising a light source, an optical system including optical elements for forming a spectrum at a first focal plane when light emanating from said source is directed through said optical elements, said spectrum having the various color components or wave lengths thereof transversely disposed in side by side parallel relation relative to the optical axis of said system, a station at a predetermined location in said optical system for receiving material to be illuminated by said light source and spectrophotometrically analyzed, light modifying means normally fixedly positioned substantially at and parallel to said first focal plane so as to reduce by desired amounts the intensities of said color components, a second optical system positioned so as to form a spectral image at a second focal plane of the light so modified passing beyond said light modifying means, a screen capable of producing a luminous spot at any location thereon where an electron stream impinges, means for projecting a stream of electrons onto said screen, an electrical system including photoelectric means for subjecting said stream to electrical influences which vary in accordance with the intensity of the light impinging upon said photoelectric means, and which influences cause said stream to be deflected upon said screen in a first direction in proportion thereto, said light modifying means having various portions thereof of different predetermined absorptive properties and so aligned with the color components of said spectrum at said first focal plane as to compensate for the inherent inequalities of the spectral energy distribution as sensed by said photoelectric means, means arranged to be connected to a source of alternating current for effecting a periodic deflection of said stream upon said screen in a second direction, a slit disposed adjacent said photoelectric means and substantially at said second focal plane, said slit being of such a width as to allow only a relatively small portion of the light forming said spectral image to pass therethrough at any single instant, and electrically operated means including an electric motor for producing periodic relative movement between said slit and said spectral image so as to successively subject the photoelectric means to the component wave lengths of said spectral image each time the electron stream is deflected in said second direction and in synchronism therewith.

2. Spectrophotometric apparatus comprising a light source, an optical system including optical elements for forming a spectrum at a first focal plane when light emanating from said source is directed through said optical elements, said spectrum having the various color components or wave lengths thereof transversely disposed relative to the optical axis of said system, a station at a predetermined location in said optical system for receiving material to be illuminated by said light source and spectrophotometrically analyzed, light modifying means normally fixedly positioned substantially at and parallel to said first focal plane so as to reduce by desired amounts the intensities of said color components, a second optical system positioned so as to form a spectral image at a second focal plane of the light so modified passing beyond said light modifying means, a screen capable of producing a luminous spot at any location thereon where an electron stream impinges, means for projecting a stream of electrons onto said screen, an electrical system including photoelectric means for subjecting said stream to electrical influences which vary in accordance with the intensity of the light impinging upon said photoelectric means, and which influences cause said stream to be deflected upon said screen in a first direction in proportion thereto, a slit disposed adjacent said photoelectric means and substantially at said second focal plane, said slit being of such a width as to allow only a relatively small portion of the light forming said spectral image to pass therethrough at any single instant, said second optical system including a reflector disposed so as to direct the light rays forming said spectral image toward said slit and photoelectric means, means including an electric motor for causing said reflector to periodically move said image across said slit so as to have the component wave lengths thereof successively impinge upon said photoelectric means, said modifying means having various portions thereof of different predetermined absorptive properties and so aligned with the color components of said spectrum at said first focal plane as to compensate for the inherent inequalities of the spectral energy distribution as sensed by said photoelectric means, and means arranged to be connected to a source of alternating current for effecting a deflection of said electron stream in a second direction on said screen each time said reflector causes said spectral image to move in a given direction across said slit and in synchronism therewith.

3. An optical system for use with spectrophotometric apparatus of the type employing photoelectric means for detecting the intensity of light impinging thereon and an oscilloscope tube having a viewing screen upon which the magnitude of said intensity is automatically visually indicated, said optical system including a light source, a first lens system including optical elements for forming a spectrum at a first focal plane when light emanating from said source is directed through said optical elements, said spectrum having the various color components or wave lengths thereof transversely disposed in side by side parallel relation relative to the optical axis of said system, a station at a predetermined location in said lens system for receiving material to be illuminated by said light source and spectrophotometrically analyzed, light modifying means normally fixedly positioned substantially at and parallel to said first focal plane so as to reduce by desired amounts the intensities of said color components, a second lens system so positioned relative to said first focal plane as to form a spectral image of the light passing beyond said light modifying means at a second focal plane, said light-modifying means having various portions thereof of different predetermined absorptive properties and so aligned with the color components of said spectrum at said first focal plane as to compensate for the inherent inequalities of the spectral energy distribution as sensed by the photoelectric means with which it is to be used, means having an elongated slit located substantially at said second focal plane, said slit being of relatively narrow width in comparison to the transverse dimension of said spectral image, and means causing a periodic relative movement between said spectral image and said slit means so as to effect a projection of the several color components forming said spectral image successively through said slit for energizing said photoelectric means.

4. An optical system for use with spectrophotometric apparatus of the type employing photoelectric means for detecting the intensity of light impinging thereon and an oscilloscope tube having a viewing screen upon which the magnitude of said intensity is automatically visually indicated, said optical system including a light source, a first lens system including optical elements for forming a spectrum at a first focal plane when light emanating from said source is directed through said optical elements, said spectrum having the various color components or wave lengths thereof transversely disposed in side by side parallel relation relative to the optical axis of said system, a station at a predetermined location in said lens system for receiving material to be illuminated by said light source and spectrophotometrically analyzed, light modifying means normally fixedly positioned substantially at and parallel to said first focal plane so as to reduce by desired amounts the intensities of said color components, a second lens system so positioned relative to said first focal plane as to form a spectral image of the light passing beyond said light modifying means at a second focal plane, said light-modifying means having various portions thereof of different predetermined absorptive properties and so aligned with the color components of said spectrum at said first focal plane as to compensate for the inherent inequalities of the spectral energy distribution as sensed by the photoelectric means with which it is to be used, means having an elongated slit located substantially at said second focal plane, said slit being of relatively narrow width in comparison to the transverse dimension of said spectral image, said second lens system including a reflector for directing the light rays for forming said spectral image and passing beyond said light modifying means toward said slit, and electrical means for periodically moving said reflector for causing said spectral image to traverse said slit so that the color components thereof will be selectively projected through said slit for energizing said photoelectric means.

5. Spectrophotometric apparatus comprising a light source, an optical system including optical elements and a refracting prism for forming a spectrum at a first focal plane when light emanating from said source is directed through said optical elements, said spectrum having the various color components or wave lengths thereof transversely disposed in side by side parallel relation relative to the optical axis of said system, a station at a predetermined location in said optical system for receiving material to be illuminated by said light source and spectrophotometrically analyzed, light modifying means normally fixedly positioned substantially at and parallel to said first focal plane so as to reduce by desired amounts the intensities of said color components, a second optical system positioned so as to form a spectral image at a second focal plane of the light so modified passing beyond said light modifying means, a slit positioned substantially at said second focal plane, a screen capable of producing a luminous spot at any location thereon where an electron stream impinges, means for projecting a stream of electrons onto said screen, an electrical system including photoelectric means for subjecting said stream to electrical influences which vary in accordance with the intensity of the light passing through said slit and impinging upon said photoelectric means, and which influences cause said stream to be deflected upon said screen in a first direction in proportion thereto, said light-modifying means having various portions thereof of different predetermined absorptive properties and so aligned with the color components of said spectrum at said first focal plane as to compensate for the inherent inequalities of the spectral energy distribution as sensed by said photoelectric means, means arranged to be connected to a source of alternating current for effecting a periodic deflection of said electron stream in a second direction upon said screen, means including an electric motor having an oscillatable member causing relative movement between said spectral image and said slit for successively subjecting said photoelectric means to the different component wave lengths of said spectral image each time the electron stream is deflected in said second direction and in synchronism therewith, and readily adjustable means for controlling amplitude and wave shape of said oscillatable member differently during opposite half cycle periods of the operation of said motor to thereby compensate for the non-linear spectral distribution of said spectral image produced by said refracting prism for effecting upon said viewing screen a spectrophotometric curve having linear wave length characteristics.

6. Spectrophotometric apparatus comprising a light source, an optical system including optical elements and a refracting prism for forming a spectrum at a first focal plane when light emanating from said source is directed through said optical elements, said spectrum having the various color components or wave lengths thereof transversely disposed in side by side parallel relation relative to the optical axis of said system, a station at a predetermined location in said optical system for receiving material to be illuminated by said light source and spectrophotometrically analyzed, light modifying means normally fixedly positioned substantially at and parallel to said first focal plane so as to reduce by desired amounts the intensities of said color components, a second optical system positioned so as to form a spectral image at a second focal plane of the light so modified passing beyond said light modifying means, a slit positioned substantially at said second focal plane, a screen capable of producing a luminous spot at any location thereon where an electron stream impinges, means for projecting a stream of electrons onto said screen, an electrical system including photoelectric means for subjecting said stream to electrical influences which vary in accordance with the intensity of the light passing through said slit and impinging upon said photoelectrics means, and which influences cause said stream to be deflected upon said screen in a first direction in proportion thereto, said light-modifying means having various portions thereof of different predetermined absorptive properties and so aligned with the color components of said spectrum at said first focal plane as to compensate for the inherent inequalities of the spectral energy distribution as sensed by said photoelectric means, means arranged to be connected to a source of alternating current for effecting a periodic deflection of said electron stream in a second direction upon said screen, means including an electric motor connected to said source of alternating current and having an oscillatable armature carrying a reflector of said second optical system for successively subjecting said photoelectric means to the color components of said spectral image each time the electron stream is deflected in said second direction and in synchronism therewith, and readily adjustable electrical components connected to said motor for controlling the amplitudes and wave shape of said oscillatable member differently during opposite half cycle periods of the operation of said motor in such a manner as to compensate for the non-linear spectral distribution of said spectral image produced by said refracting prism, thereby effecting upon said viewing screen a spectrophotometric curve having linear wave length characteristics.

7. Spectrophotometric apparatus comprising a light source, an optical system including optical elements for forming a spectrum at a first focal plane when light emanating from said source is directed through said optical elements, said spectrum having the various color components or wave lengths thereof transversely disposed in side by side parallel relation relative to the optical axis of said system, a station at a predetermined location in said optical system for receiving material to be illuminated by said light source and spectrophotometrically analyzed, light modifying means normally fixedly positioned substantially at and parallel to said first focal plane so as to reduce by desired amounts the intensities of said color components, a second optical system positioned so as to form a spectral image at a second focal plane of the light so modified passing beyond said light modifying means, a screen capable of producing a luminous spot at any location thereon where an electron stream impinges, means for projecting a stream of electrons onto said screen, an electrical system including photoelectric means for subjecting said stream to electrical influences which vary in accordance with the intensity of the light impinging upon said photoelectric means, and which influences cause said stream to be deflected upon said screen in a first direction in proportion thereto, said light-modifying means having various portions thereof of different predetermined absorptive properties and so aligned with the color components of said spectrum at said first focal plane as to compensate for the inherent inequalities of the spectral energy distribution as sensed by said photoelectric means, means arranged to be connected to a source of alternating current for effecting a periodic deflection of said stream upon said screen in a second direction, a slit disposed adjacent said photoelectric means and substantially at said second focal plane, said slit being of such a width as to allow only a relatively small portion of the light forming said spectral image to pass therethrough at any single instant, electrically operated means including an electric motor for producing periodic relative movement between said slit and said spectral image so as to successively subject the photoelectric means to the component wave lengths of said spectral image each time the electron stream is deflected in said second direction and in synchronism therewith, and electrical means operable in predetermined phase relation to the means affecting the electron stream deflection in said second direction for blanking out the electron stream during a major portion of its travel in the opposite direction so as to periodically prevent the impingement of said stream upon said screen.

8. Spectrophotometric apparatus comprising a light source, an optical system including optical elements for forming a spectrum at a first focal plane when light emanating from said source is directed through said optical elements, said spectrum having the various color components or wave lengths thereof transversely disposed in side-by-side parallel relation relative to the optical axis of said system, a station at a predetermined location in said optical system for receiving material to be illuminated by said light source and spectrophotometrically analyzed, light modifying means normally fixedly positioned substantially at and parallel to said first focal plane so as to reduce by desired amounts the intensities of said color components, a second optical system positioned so as to form a spectral image at a second focal plane of the light so modified passing beyond said light modifying means, a screen capable of producing a luminous spot at any location thereon where an electron stream impinges, means for projecting a stream of electrons onto said screen, an electrical system including photoelectric means for subjecting said stream to electrical influences which vary in accordance with the intensity of the light impinging upon said photoelectric means, and which influences cause said stream to be deflected upon said screen in a first direction in proportion thereto, a slit disposed adjacent said photoelectric means and substantially at said second focal plane, said slit being of such a width as to allow only a relatively small portion of the light forming said spectral image to pass therethrough at any single instant, said second optical system including a reflector disposed so as to direct the light rays forming said spectral image toward said slit and photoelectric means, means including an electric motor arranged to be connected to a source of alternating current for causing said reflector to periodically move said image across said slit so as to have the color components of said image successively impinge upon said photoelectric means, said light-modifying means having various portions thereof of different predetermined absorptive properties and so aligned with the color components of said spectrum at said first focal plane as to compensate for the inherent inequalities of the spectral energy distribution as sensed by said photoelectric means, means for effecting a deflection of said electron stream in a second direction on said screen each time said reflector causes said spectral image to move in a given direction across said slit and in synchronism therewith, and electrical means operable in predetermined phase relation to the means effecting the electron stream deflection in said second direction for blanking out the electron stream during a major portion of its travel in the opposite direction so as to periodically prevent the impingement of said stream upon said screen.

9. Spectrophotometric apparatus comprising a light source, an optical system including optical elements and a refracting prism for forming a spectrum at a first focal plane when light emanating from said source is directed through said optical elements, said spectrum having the various color components or wave lengths thereof transversely disposed in side by side parallel relation relative to the optical axis of said system, a station at a predetermined location in said optical system for receiving material to be illuminated by said light source and spectrophotometrically analyzed, light modifying means normally fixedly positioned substantially at and parallel to said first focal plane so as to reduce by desired amounts the intensities of said color components, a second optical system positioned so as to form a spectral image at a second focal plane of the light so modified passing beyond said light modifying means, a screen capable of producing a luminous spot at any location thereon where an electron stream impinges, means for projecting a stream of electrons onto said screen, an electrical system including photoelectric means for subjecting said stream to electrical influences which vary in accordance with the intensity of the light impinging upon said photoelectric means, and which influences cause said stream to be deflected upon said screen in a first direction in proportion thereto, said light-modifying means having various portions thereof of different predetermined absorptive properties and so aligned with the color components of said spectrum at said first focal plane as to compensate for the inherent inequalities of the spectral energy distribution as sensed by said photoelectric means, means arranged to be connected to a source of alternating current for effecting a periodic deflection of said electron stream in a second direction upon said screen, a slit adjacent said photoelectric means and disposed substantially at said second focal plane, means including an electric motor having an oscillatable armature carrying a reflector of said second optical system for causing said image to move relative to said slit and successively subjecting said photoelectric means to the color components thereof each time the electron stream is deflected in said second direction and in synchronism therewith, readily adjustable electrical components connected to said motor for controlling the amplitudes and wave shape of said oscillatable member differently during opposite half cycle periods of the operation of said motor to thereby compensate for the nonlinear spectral distribution of said spectral image produced by said refracting prism, thereby effecting upon said viewing screen a spectrophotometric curve for linear wave length characteristics, and electrical means operable in predetermined phase relation to the means effecting the electron stream deflection in said second direction for blanking out the electron stream during a major portion of its travel in the opposite direction so as to periodically prevent the impingement of said stream upon said screen.

10. Spectrophotometric apparatus comprising a light source, an optical system including optical elements for forming a spectrum at a first focal plane when light emanating from said source is directed through said optical elements, said spectrum having the various color components or wave lengths thereof transversely disposed in side by side parallel relation relative to the optical axis of said system, a station at a predetermined location in said optical system for receiving material to be illuminated by said light source and spectrophotometrically analyzed, light modifying means normally fixedly positioned substantially at and parallel to said first focal plane so as to reduce by desired amounts the intensities of said color components, a second optical system positioned so as to form a spectral image at a second focal plane of the light so modified passing beyond said light modifying means, a screen capable of producing a luminous spot at any location thereon where an electron stream impinges, means for projecting a stream of electrons onto said screen, an electrical system including photoelectric means for subjecting said stream to electrical influences which vary in accordance with the intensity of the light impinging upon said photoelectric means, and which influences cause said stream to be deflected upon said screen in a first direction in proportion thereto, said light-modifying means having various portions thereof of different predetermined absorptive properties and so aligned with the color components of said spectrum at said first focal plane as to compensate for the inherent inequalities of the spectral energy distribution as sensed by said photoelectric means, means arranged to be connected to a source of alternating current effecting a periodic deflection of said stream upon said screen in a second direction, a slit disposed adjacent said photoelectric means and substantially at said second focal plane, said slit being of such a width as to allow only a relatively small portion of the light forming said spectral image to pass therethrough at any single instant, electrically operated means including an electric motor for producing periodic relative movement between said slit and said spectral image so as to successively subject the photoelectric means to the color components of said spectral image each time the electron stream is deflected in said second direction and in synchronism therewith, and adjustable electrical means connected to the photoelectric means so as to modify the response characteristics of the photoelectric means to the light impinging thereon during a predetermined portion of each period during which the photoelectric means is subjected to said spectral image, whereby a substantially straight line may be provided upon said screen in said second direction when no material is in the apparatus for analyzation.

11. Spectrophotometric apparatus comprising a light source, an optical system including optical elements for forming a spectrum at a first focal plane when light emanating from said source is directed through said optical elements, said spectrum having the various color components or wave lengths thereof transversely disposed relative to the optical axis of said system, a station at a predetermined location in said optical system for receiving material to be illuminated by said light source and spectrophotometrically analyzed, light modifying means normally fixedly positioned substantially at and parallel to said first focal plane so as to reduce by desired amounts the intensities of said color components, a second optical system positioned so as to form a spectral image at a second focal plane of the light so modified passing beyond said light modifying means, a screen capable of producing a luminous spot at any location thereon where an electron stream impinges, means for projecting a stream of electrons onto said screen, an electrical system including photoelectric means for subjecting said stream to electrical influences which vary in accordance with the intensity of the light impinging upon said photoelectric means, and which influences cause said stream to be deflected upon said screen in a first direction in proportion thereto, a slit disposed adjacent said photoelectric means and substantially at said second focal plane, said slit being of such a width as to allow only a relatively small portion of the light forming said spectral image to pass therethrough at any single instance, said second optical system including a pivotally mounted reflector disposed so as to direct the light rays forming said spectral image toward said slit and photoelectric means, means including an electric motor arranged to be connected to a source of alternating current for causing said reflector to periodically move said image across said slit so as to have the color components of said image successively impinge upon said photoelectric means, said light-modifying means having various portions thereof of different predetermined absorptive properties and so aligned with the components of said spectrum at said first focal plane as to compensate for the inherent inequalities of said spectral energy distribution as sensed by said photoelectric means, means for effecting a deflection of said electron stream in a second direction on said screen each time said reflector causes said spectral image to move in a given direction across said slit and in synchronism therewith, and adjustable electrical means connected to the photoelectric means so as to modify the response characteristics of said photoelectric means to the light impinging thereon during a predetermined portion of each period during which the photoelectric means is subjected to said spectral image, whereby a substantially straight line may be provided upon said screen in said second direction when no material is in the apparatus for analyzation.

12. Spectrophotometric apparatus comprising a light source, an optical system including optical elements for forming a spectrum at a first focal plane when light emanating from said source is directed through said optical elements, said spectrum having the various color components or wave lengths thereof transversely disposed relative to the optical axis of said system, a station at a predetermined location in said optical system for receiving material to be illuminated by said light source and spectrophotometrically analyzed, light modifying means normally fixedly positioned substantially at and parallel to said first focal plane so as to reduce by desired amounts the intensities of said color components, a second optical system positioned so as to form a spectral image at a second focal plane of the light so modified passing beyond said light modifying means, a screen capable of producing a luminous spot at any location thereon where an electron stream impinges, means for projecting a stream of electrons onto said screen, an electrical system including photoelectric means for subjecting said stream to electrical influences which vary in accordance with the intensity of the light impinging upon said photoelectric means, and which influences cause said stream to be deflected upon said screen in a first direction in proportion thereto, a slit disposed adjacent said photoelectric means and substantially at said second focal plane, said slit being of such a width as to allow only a relatively small portion of the light forming said spectral image to pass therethrough at any single instant, said second optical system including a pivotally mounted reflector disposed so as to direct the light rays forming said spectral image toward said slit and photoelectric means, means including an electric motor arranged to be connected to a source of alternating current for causing said reflector to periodically move said image across said slit so as to have the color components of said image successively impinge upon said photoelectric means, said light-modifying means having various portions thereof of different predetermined absorptive properties and so aligned with the components of said spectrum at said first focal plane as to compensate for the inherent inequalities of said spectral energy distribution as sensed by said photoelectric means, means for effecting a deflection of said electron stream in a second direction on said screen each time said reflector causes said spectral image to move in a given direction across said slit and in synchronism therewith, current rectifying means connected to the photoelectric means for modifying the normal response characteristics of the photoelectric means to the light impinging thereon during predetermined spaced portions of each traverse of said spectral image in a predetermined direction across said slit, and adjustable electric means connected to said rectifying means for independently controlling the amount of modification provided said photoelectric means during the travel of said spaced portions of said spectral image in a predetermined direction across said slit, whereby a substantially straight line may be provided upon said screen in said second direction when no material is in the apparatus for analyzation.

13. Spectrophotometric apparatus comprising a light source, an optical system including optical elements and a refracting prism for forming a spectrum at a first focal plane when light emanating from said source is directed through said optical elements and prism, said spectrum having the various color components or wave lengths thereof transversely disposed in side-by-side parallel relation relative to the optical axis of said system, a station at a predetermined location in said optical system for receiving material to be illuminated by said light source and spectrophotometrically analyzed, light-modifying means normally fixedly positioned substantially at and parallel to said first focal plane so as to reduce by desired amounts the intensities of said color components, a second optical system positioned so as to form a spectral image at a second focal plane of the light so modified and passing beyond said light-modifying means, a screen capable of producing a luminous spot at any location thereon where an electron stream impinges, means for projecting a stream of electrons on to said screen, an electrical system including photoelectric means for subjecting said stream to electrical influences which vary in accordance with the intensity of the light impinged upon said photoelectric means, and which influences cause said stream to be deflected upon said screen in a first direction in proportion thereto, a slit disposed adjacent said photoelectric means and substantially at said second focal plane, said slit being of such a width as to allow only a relatively small portion of the light forming said spectral image through said slit and to said photoelectric means at any single instant, means including an oscillatable electric motor and a power supply circuit arranged to be connected to a source of alternating current, said motor having a pivotally mounted armature arranged to oscillate in synchronous relation to the frequency of said alternating current, electrical components in said power supply circuit for providing amplitudes of different controlled amounts during opposite half cycle periods of oscillation of said armature, a reflector carried by said armature, oscillation of said armature causing said reflector to move said image across said slit so as to have the wave lengths of said spectral image successively impinge upon said photoelectric means, and means for effecting a deflection of said electron stream in predetermined phase relation to said alternating current in a second direction upon said screen each time said reflector causes said spectral image to move in a given direction across said slit, said amplitudes of oscillation of said reflector of different controlled amounts providing in a portion of each cycle of movement of said reflector a non-linear wave shape which is such as to substantially compensate for the inherent non-linear dispersion characteristics which result from said prism, whereby an approximately linear dispersion curve may be displayed against light intensities upon said screen.

14. Spectrophotometric apparatus comprising a light source, an optical system including optical elements and a refracting prism for forming a spectrum at a first focal plane when light emanating from said source is directed through said optical elements and prism, said spectrum having the various color components or wave lengths thereof transversely disposed in side-by-side parallel relation relative to the optical axis of said system, a station at a predetermined location in said optical system for receiving material to be illuminated by said light source and spectrophotometrically analyzed, light-modifying means normally fixedly positioned substantially at and parallel to said first focal plane so as to reduce by desired amounts the intensities of said color components, a second optical system positioned so as to form a spectral image at a second focal plane of the light so modified and passing beyond said light-modifying means, a screen capable of producing a luminous spot at any location thereon where an electron stream impinges, means for projecting a stream of electrons on to said screen, an electrical system including photoelectric means for subjecting said stream to electrical influences which vary in accordance with the intensity of the light impinged upon said photoelectric means, and which influences cause said stream to be deflected upon said screen in a first direction in proportion thereto, a slit disposed adjacent said photoelectric means and substantially at said second focal plane, said slit being of such a width as to allow only a relatively small portion of the light forming said spectral image through said slit and to said photoelectric means at any single instant, means including an oscillatable electric motor and a power supply circuit arranged to be connected to a source of alternating current, said motor having a pivotally mounted armature arranged to oscillate in synchronous relation to the frequency of said alternating current, electrical components in said power supply circuit for providing amplitudes of different controlled amounts during opposite half cycle periods of oscillation of said armature, said armature being arranged to cause relative movement between said spectral image and said slit so as to have the wave lengths of said spectral image successively impinge upon said photoelectric means, and means for effecting a deflection of said electron stream in predetermined phase relation to said alternating current in a second direction upon said screen each time relative movement between said spectral image and said slit in a given direction occurs, said amplitude of oscillation of said armature of different controlled amounts providing in a portion of each cycle of movement of said armature a non-linear wave shape which is such as to substantially compensate for the inherent non-linear dispersion characteristics resulting from said prism, whereby an approximately linear dispersion curve may be displayed against light intensities upon said screen.

15. Spectrophotometric apparatus comprising a light source, a first optical system including optical elements and a refracting prism for forming a spectrum at a first focal plane when light emanating from said light source is directed through said optical elements and said prism, said spectrum having the various color components thereof transversely disposed in side-by-side parallel relation relative to the optical axis of said system, a station at a predetermined location in said first optical system for receiving material to be illuminated by said light source and spectrophotometrically analyzed, a second optical system optically aligned with said first optical system and positioned so as to receive light rays forming said spectrum and passing beyond said first focal plane and form a spectral image at a second focal plane, a slit positioned substantially at said second focal plane and disposed in substantially parallel relation to the color components forming said spectral image, said slit being of such a width as to allow only a relatively small portion of the light rays forming said spectral image to pass therethrough at any single instant, a screen capable of producing a luminous spot at any location thereon where an electron stream impinges, means for projecting a stream of electrons onto said screen, an electrical system including photoelectric means positioned adjacent said slit so as to intercept light rays of said spectral image passing through said slit, said photoelectric means subjecting said stream to electrical influences which vary in accordance with the intensity of the light rays intercepted thereby, and which influences cause said stream to be deflected upon said screen in a first direction in proportion thereto, means for connection to a source of alternating current for effecting a periodic deflection of said electron stream in a second direction upon said screen, means including an electric motor for causing relative movement between said spectral image and said slit for successively subjecting said photoelectric means to the different color components of said spectral image each time the electron stream is deflected in said second direction upon said screen and in synchronism therewith, said motor comprising pivotally mounted oscillatable armature means, a pair of electromagnets for alternately actuating said armature means, said armature means having portions thereof normally disposed in a neutral position adjacent said electromagnets so as to be within the magnetic influence thereof when energized, resilient means positioned in a substantially non-stressed condition adjacent said armature means when said armature means is in said neutral position, electrical circuits including rectifying means adapted to receive alternating current from said alternating current source and alternately subject said electromagnets to said current during opposite half cycle periods thereof and to cause said armature means to oscillate in a predetermined phase relation relative to the periodic deflection of said electron stream in said second direction, and electrical components in said electric circuits for differently modifying by controlled amounts the amplitudes of oscillation of said armature means during opposite half cycle periods of operation of said motor, said electrical components providing in a portion of each cycle of movement of said armature means a non-linear wave shape which is such as to substantially compensate for the inherent non-linear dispersion characteristics of said prism, whereby an approximately linear dispersion curve may be displayed relative to light intensities upon said screen when the color characteristics of material at said station are being analyzed.

16. Spectrophotometric apparatus comprising a light source, a first optical system including optical elements and a refracting prism for forming a spectrum at a first focal plane when light emanating from said light source is directed through said optical elements and said prism, said spectrum having the various color components thereof transversely disposed in side-by-side parallel relation relative to the optical axis of said system, a station at a predetermined location in said first optical system for receiving material to be illuminated by said light source and spectrophotometrically analyzed, a second optical system optically aligned with said first optical system and positioned so as to receive light rays forming said spectrum and passing beyond said first focal plane and form a spectral image at a second focal plane, a slit positioned substantially at said second focal plane and disposed in fixed substantially parallel relation to the color components forming said spectral image, said slit being of such a width as to allow only a relatively small portion of the light rays forming said spectral image to pass therethrough at any single instant, said second optical system including a reflecting optical element disposed so as to direct said light rays forming said spectral image toward said slit, a screen capable of producing a luminous spot at any location thereon where an electron stream impinges, means for projecting a stream of electrons onto said screen, an electrical system including photoelectric means positioned adjacent said slit so as to intercept light rays of said spectral image passing through said slit, said photoelectric means subjecting said stream to electrical influences which vary in accordance with the intensity of the light rays intercepted thereby, and which influences cause said stream to be deflected upon said screen in a first direction in proportion thereto, means for connection to a source of alternating current for effecting a periodic deflection of said electron stream in a second direction upon said screen, means including an electric motor for causing relative movement between said spectral image and said slit for successively subjecting said photoelectric means to the different color components of said spectral image each time the electron stream is deflected in said second direction upon said screen and in synchronism therewith, said motor comprising pivotally mounted oscillatable armature means supporting said reflecting optical element for movement therewith, a pair of electromagnets for alternately actuating said armature means, said armature means having portions thereof normally disposed in a neutral position adjacent said electromagnets so as to be within the magnetic influence thereof when energized, resilient means positioned in a substantially non-stressed condition adjacent said armature means when said armature means is in said neutral position, electrical circuits including rectifying means adapted to receive alternating current from said alternating current source and alternately subject said electromagnets to said current during opposite half cycle periods thereof and to cause said armature means to oscillate said reflecting optical element in a predetermined phase relation relative to the periodic deflection of said electron stream in said second direction, and electrical components in said electric circuits for differently modifying by controlled amounts the amplitudes of oscillation of said armature means during opposite half cycle periods of operation of said motor, said electrical components providing in a portion of each cycle of movement of said armature means a non-linear wave shape which is such as to substantially compensate for the inherent non-linear dispersion characteristics of said prism, whereby an approximately linear dispersion curve may be displayed relative to light intensities upon said screen when the color characteristics of material at said station are being analyzed.

RICHARD C. BEITZ.

REFERENCES CITED

The following references are of record in the file of this patent:

UNITED STATES PATENTS

| Number | Name | Date |
|---|---|---|
| Re. 19,816 | Wurzback | Jan. 7, 1936 |
| 2,046,958 | Marvin | July 7, 1936 |
| 2,193,606 | Ulrey | Mar. 12, 1940 |
| 2,206,244 | Weyandt | July 2, 1940 |
| 2,330,877 | Fleisher et al. | Oct. 5, 1943 |
| 2,349,656 | Gulliksen | May 23, 1944 |
| 2,406,318 | Brace | Aug. 27, 1946 |
| 2,411,741 | Michaelson | Nov. 26, 1946 |
| 2,437,323 | Heigl et al. | Mar. 9, 1948 |
| 2,444,560 | Feldt et al. | July 6, 1948 |

FOREIGN PATENTS

| Number | Country | Date |
|---|---|---|
| 873,671 | France | Mar. 30, 1942 |